United States Patent [19]

Laporte

[11] 4,399,429
[45] Aug. 16, 1983

[54] ELECTRONIC ADAPTER FOR A DIAGNOSTIC PICKUP OF DATA SUPPLIED BY AN ELECTRONIC CONTROL CIRCUIT

[75] Inventor: Alain Laporte, Villate, France

[73] Assignee: Renix Electronique S.A., Toulouse, France

[21] Appl. No.: 304,782

[22] Filed: Sep. 23, 1981

[30] Foreign Application Priority Data

Sep. 23, 1980 [FR] France ............................ 80 20390

[51] Int. Cl.³ .......................................... G08B 29/00
[52] U.S. Cl. ............................... 340/507; 340/52 F; 340/653; 340/664
[58] Field of Search ................. 340/52 D, 52 F, 506, 340/507, 653, 664; 364/424

[56] References Cited

U.S. PATENT DOCUMENTS 3,604,949  9/1971  Kugelmann et al. ........... 340/653 X
4,254,410  3/1981  Virkus ........................... 340/506 X
4,267,569  5/1981  Baumann et al. ............... 364/424 X
4,317,364  3/1982  Asano et al. ..................... 340/52 F

FOREIGN PATENT DOCUMENTS 2343379  9/1977  France.

Primary Examiner—David L. Trafton
Attorney, Agent, or Firm—Oblon, Fisher, Spivak, McClelland & Maier

[57] ABSTRACT

An electronic control circuit of the type including a microprocessor, a circuit for monitoring the operational state of the microprocessor connected directly to a first output of the microprocessor, and a warning light of the control circuit and its input and output peripherals. The warning light is connected to a second output of said microprocessor through a starter and protection circuit and thus diagnostic data are available in series at the input terminal of said warning light which is also the output of said starter and protection circuit.

5 Claims, 2 Drawing Figures

ELECTRONIC ADAPTER FOR A DIAGNOSTIC PICKUP OF DATA SUPPLIED BY AN ELECTRONIC CONTROL CIRCUIT

BACKGROUND OF THE INVENTION

1. Field of the Invention

The present invention relates in general to a novel electronic adapter for a diagnostic pickup of the data supplied by an electronic control circuit, and more particularly to a novel connection to the control wire of a warning light for the diagnosis of an electronic control circuit.

2. Description of the Prior Art

In the field of automobile electronics, when an electronic control circuit employing, in particular, a microprocessor is used, it is common to connect a diagnostic pickup to the output circuits in order to have easy access to the data necessary for diagnosis of the system. A warning light being energized on the dashboard of the automobile warns the driver that a defect has arisen in the electronic control circuit or in its input or output peripherals and thus warns the driver that repairs are necessary.

Practical realizations of diagnostic pickups according to the prior art lead to complex and costly devices because of the large number of conductors leading into the devices, the problems of protecting each of these conductors which results in the creation of complex and expensive interfaces, and problems of tightness.

The present invention makes it possible to avoid these drawbacks.

SUMMARY OF THE INVENTION

Accordingly, one object of the present invention is to provide an electronic adapter for a diagnostic pickup of the data supplied by an electronic control circuit, of the type including a microprocessor, a circuit for monitoring the operational state of the microprocessor, and a warning light for the electronic control circuit and its input and output peripherals. Among the novel features of the present invention are that the warning light is connected to a second output pin of the microprocessor through a starter and protection circuit, and that the diagnostic data are available serially at the input terminal of the warning light.

According to a first preferred embodiment of the subject invention, the adapter includes a first transistor having its base coupled to the output of the monitoring circuit and coupled to the second output of the microprocessor. The emitter of the first transistor is coupled to ground and the collector is coupled to the warning light through a first resistor which supplies drive current to a Darlington circuit coupled in parallel with the warning light. Advantageously, the output of the monitoring circuit is coupled to the base of the first transistor through a second resistor which supplies control current to the transistor and to a protective diode.

According to a second preferred embodiment of the subject invention, the emitter of the Darlington circuit is grounded through a third resistor and a second transistor is connected by its collector to the collector of the first transistor and to the base of the Darlington circuit. The emitter of the second transistor s coupled to ground and its base is coupled to the junction of the emitter of the Darlington circuit and the third resistor.

According to a third preferred embodiment of the subject invention, a capacitor assuring the stability of the adapter circuit's output is connected between the collectors of the second transistor and the collector of the Darlington circuit.

In this way, the data are obtained in the form of coded messages which enable repair facilities to check and repair the system and its pickups without the addition of a special and complex connectors or interfaces, which constitutes an appreciable saving.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
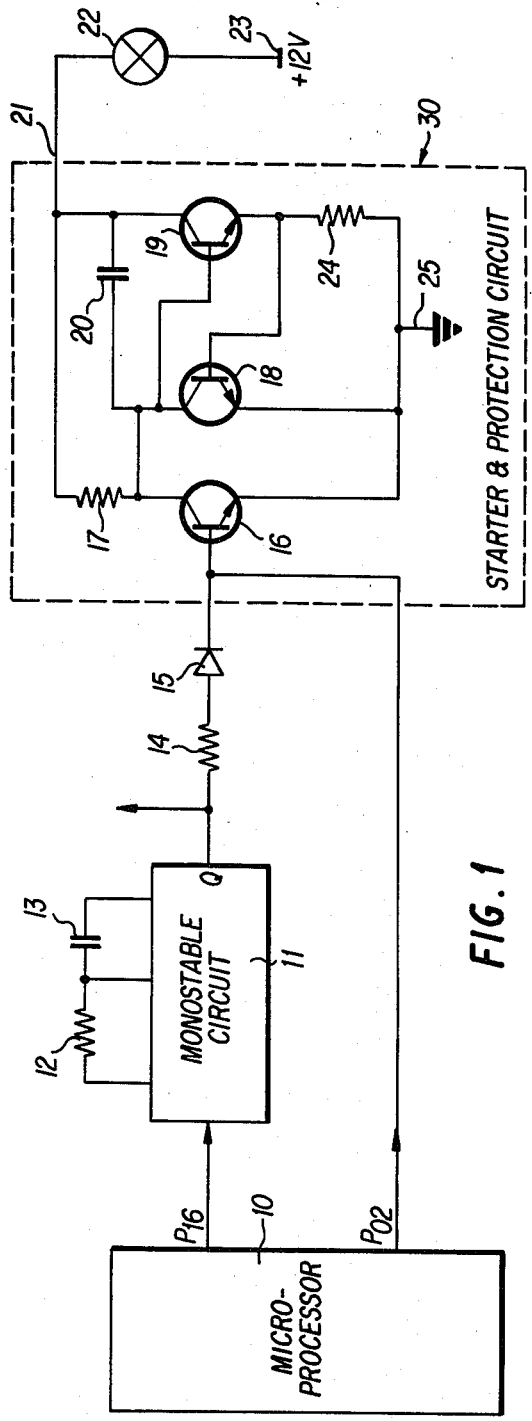
FIG. 1 is a schematic diagram of a first preferred embodiment of the present invention.

Referring now to the drawings, wherein like reference numerals designate identical or corresponding parts throughout the several views, and more particularly to FIG. 1 thereof, a microprocessor 10 includes an output $P_{16}$ coupled to a monostable circuit 11. The output Q of the monostable circuit is coupled to the base of a first transistor 16 through the serial connection of a resistor 14 and a protective diode 15. The width of the pulse supplied by the monostable circuit 11 is regulated by means of a resistor 12 and a capacitor 13, as is known to persons skilled in the art. A second output $P_{02}$ of the microprocessor 10 is likewise connected to the base of the first transistor 16, which constitutes the input element of a starter and protection circuit 30 having its output 21 connected to the input terminal of a warning light 22 placed, for example, on the dashboard of an automobile. The other terminal 23 of the warning light 22 is connected to a voltage of $+12$ V from the vehicle's battery.

The starter and protection circuit 30 also includes a second transistor 18 and a power Darlington circuit 19. The emitters of the two transistors 16 and 18 are grounded at junction point 25, while the emitter of the Darlington circuit is grounded to junction point 25 through a resistor 24. The transistor 18 and the resistor 24, having a low ohmic value, make it possible to set the maximum current flowing through in the warning light 22. The output transistor 19 is thereby protected against the application of the $+12$ Volts at the junction point 21, regardless of whether it is saturated or blocked. The combination of the transistor 18 and the resistor 24 in its base circuit represents a current limitation that is set according to the characteristics of the warning light 22 and the thermal dissipation possible over the transistor 18 in the case of the imposition of the battery plus voltage at the point 21 when the transistor 18 is saturated.

The collector of the first transistor 16 is connected to the input terminal 21 of the warning light 22 through a resistor 17 which conditions the supply of a basic and therefore drive current to the Darlington circuit 19, and to the collector of the Darlington circuit 19 through a capacitor 20 assuring the stability of the output, as well as to the base of the Darlington circuit and to the collector of the second transistor 18. The collector of the transistor 18 is thus connected to the resistor 17 and to the capacitor 20, as well as to the base of the Darlington circuit 19, and the collector of the Darlington circuit 19 is connected to the junction point 21, which forms both the output terminal of the circuit 30 and the input terminal of the warning light, as has been described above.

The warning light 22 may be for example, the defect light of an electronic system of which the microprocessor 10 is only a part. The warning light 22 lights up if the microprocessor 10 detects an operational anomaly in one of the system's pickups, such as the speed pickup, load pickup, electrohydraulic interface, or if the monostable circuit 11 should be put out of commission according to the "watchdog" principle, control of which is effected periodically by the pulses appearing over the output $P_{16}$ of the microprocessor. If there is no defect, the monostable circuit is put back into commission. Its output Q is in the high state. The output $P_{02}$ is likewise in the high state in this case. It must be noted that the microprocessor 10 is such that its output terminal $P_{02}$ has no "impedance" connected to a power source and thus is an "open collector". In this case the transistor 16 is thus saturated, which blocks the Darlington circuit 19 since the voltage at its base no longer allows its conduction.

As soon as a defect is signaled by the microprocessor 10, its output terminal $P_{02}$ goes into the low state. The transistor 16 is then blocked, and the Darlington circuit 19 begins to conduct. The warning light 22 is thus lit. Likewise, the warning light 22 is lit when the monostable circuit 11 is placed out of commission. Indeed, if the microprocessor is no longer controlling the monostable circuit 11, the latter's output Q goes to zero, and regardless of the state of the output terminal $P_{02}$ the transistor 16 is blocked, which brings the Darlington circuit 19 to its conduction through a basic current imposed by the resistor 17.

The capacitor 20 assures the unconditional stability of the current-regulating device consisting of the transistor 18 and the resistor 24. It thereby guarantees the purity of the logical transitions during transmission of the data to the warning light by prohibiting any parasitic oscillations.

It can therefore be seen that the warning light 22 may be turned on or off according to the desired control by the microprocessor 10 or according to the state of the monostable circuit 11. The state of the monostable circuit 11 furthermore has priority.

Figure 2:
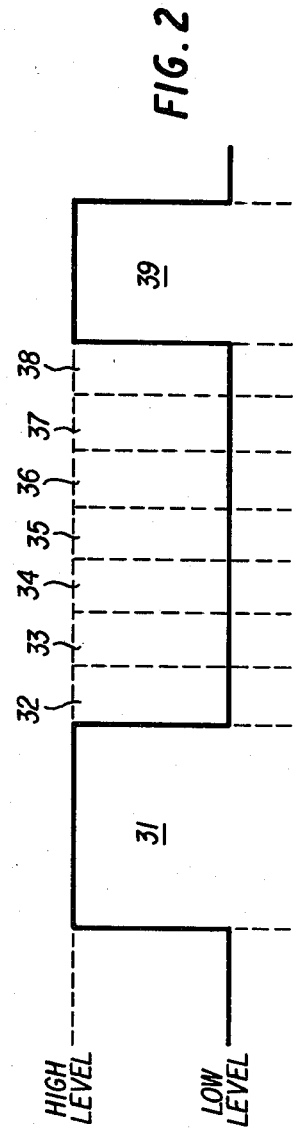
FIG. 2 illustrates one example of the data available in the form of a series of messages at the control output of the warning light shown in FIG. 1.

The object of the present invention is to extract in the form of serial messages the data necessary for adjustment or post-sale servicing from the control output terminal 21 of the starter and protection circuit 30. The data are taken out in the form shown in FIG. 2. These data are extracted at the output terminal 21, whether the warning light 22 is lit or turned off. For this purpose, the warning light 22 is turned off for 420 microsecond (interval 31) unless it is already turned off. Then at the rate of 60 micros per unit of information, the following data are extracted. The order indicated below is supplied solely by way of a nonlimiting example:

Interval 32: START: this allows for synchronization of the system for reading the data to be decoded.

Interval 33: ELECTRO DEFECT: at the high level, if there is an electromagnetic sluice gate defect detected by 10; at the low level in other cases.

Interval 34: SPEED DEFECT: at the high level, if a defect in the speed pickup is found; at the low level in other cases.

Interval 35: LOAD PICKUP DEFECT: at the high level, if a defect is found in the load measurement; at the level in other cases.

Interval 36: FM2: represents the state of the speed selector.

Interval 37: FM1: represents the state of the speed selector.

Interval 38: RC: indicates if the pedal is in kick-down position.

Interval 39: STOP: this allows the system for reading the preceeding data to be informed of the end of the reading of these six units of information.

The warning light 22 is then returned to the state — lit or off — which it had been in before these data were outputted. The microprocessor 10 controls the output of this diagnosis with sufficiently slow recurrence so that the warning light appears to remain lit or off, according to the statistical state given it. The diagnosis output recurrence must therefore be greater than that perceived by the eye, much lower than 50 Hz, for example. Of course, the number of pieces of information to be outputted at the terminal 21 may be increased, so long as the preceeding condition is met. The lighting of the warning light can also be actuated for a short period of time when the system is initialized in order to check the condition of the light. This limited actuation is also effected by the output $P_{02}$ of the microprocessor 10.

Should the monostable circuit 11 be put out of commission because of a defect in the microprocessor 10, the warning light 22 is lit as previously indicated, but there is no series of data outputted at the terminal 21 since the transistor 16 is blocked. Likewise, should the power to the mficroprocessor 10 disappear, the warning light 22 lights up as explained previously and the series message disappears as well. For this purpose, the $+12$ V power to the warning light must, of course, be present.

Locating the sampling of the diagnostic data at the terminal 21, which constitutes the input terminal of the warning light 22, has the following advantages:

It allows the very complex and expensive prior art diagnosis to be eliminated.

It allows the desired data to be extracted from a terminal 21 assigned to another purpose with protections having already been applied.

It allows changing the information supplied to the diagnosis merely by changing the microprocessor's program, without touching the electronic circuit 30.

It allows increasing the number of pieces of information to be extracted without increasing the cost of the product.

It allows reducing by appreciable proportions the overall cost of the product.

The warning light 22 may also be replaced by an electroluminescent diode or light emitting diode in series with a resistor. In this case, the diagnostic reading means can be an optical reader placed opposite the electroluminescent diode. This optical solution eliminates the need to be physically connected to the housing. The warning light may also be replaced by any pickup or actuator, such as: relays, lamps, electroluminescent diodes, electromagnets, and other such devices.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electronic adapter for the pickup of diagnostic data supplied by an electronic control circuit of the type including a microprocessor, said adapter comprising:
    monitoring circuit means coupled to receive a first output of said microprocessor for monitoring the operational state of said microprocessor;
    starter and protection circuit means coupled to receive the output of said monitoring circuit from an output terminal of said monitoring circuit means and coupled to receive said diagnostic data from a second output of said microprocessor for processing said output of said monitoring circuit means and said diagnostic data to produce processed data and for supplying said processed data in serial form to an output terminal of said starter and protection circuit means; and
    display means coupled to said output terminal of said starter and protection circuit means for displaying that a malfunction has occurred in at least one of said electronic control circuit and a plurality of input and output peripheral devices.

2. The electronic adapter as recited in claim 1, wherein said starter and protection circuit means comprises:
    a first transistor including a base coupled to receive the output of said monitoring circuit means and coupled to said second output of said microprocessor, an emitter coupled to ground, and a collector coupled through a first resistor to said output terminal of said starter and protection circuit; and
    a Darlington transistor including a base coupled to said collector of said first transistor, a collector coupled to said output terminal of said starter and protection circuit means, and an emitter coupled through a second resistor to ground.

3. The electronic adapter as recited in claim 2, which further comprises:
    a series circuit including a third resistor coupled in series with a protective diode, said series circuit being coupled between said output terminal of said monitoring circuit means and said base of said first transistor.

4. The electronic adapter as recited in claim 2 or claim 3, wherein said starter and protection circuit means further comprises:
    a second transistor including a base coupled to said collector of said Darlington transistor, a collector coupled to said collector of said first transistor, and an emitter coupled to said emitter of said first transistor.

5. The electronic adapter as recited in claim 4, wherein said starter and protection circuit means further comprises:
    a capacitor coupled between said collector of said first transistor and said collector of said Darlington transistor.

* * * * *